(12) United States Patent
Lu et al.

(10) Patent No.: US 10,106,081 B2
(45) Date of Patent: Oct. 23, 2018

(54) LASER GUIDED PARKING ASSISTANCE DEVICE

(71) Applicants: Jiang Lu, Arvada, CO (US); Fangqin Liu, Arvada, CO (US)

(72) Inventors: Jiang Lu, Arvada, CO (US); Fangqin Liu, Arvada, CO (US)

(*) Notice: Subject to any disclaimer, the term of this patent is extended or adjusted under 35 U.S.C. 154(b) by 0 days.

(21) Appl. No.: 15/216,987

(22) Filed: Jul. 22, 2016

(65) Prior Publication Data

US 2017/0021767 A1 Jan. 26, 2017

Related U.S. Application Data

(60) Provisional application No. 62/196,965, filed on Jul. 25, 2015.

(51) Int. Cl.
*B60Q 9/00* (2006.01)
*G05D 1/02* (2006.01)
*H05B 33/08* (2006.01)

(52) U.S. Cl.
CPC ............ *B60Q 9/004* (2013.01); *G05D 1/024* (2013.01); *H05B 33/0806* (2013.01); *H05B 33/0842* (2013.01)

(58) Field of Classification Search
CPC .... B60Q 9/004; G05D 1/024; H05B 33/0806; H05B 33/0842
See application file for complete search history.

(56) References Cited

U.S. PATENT DOCUMENTS 3,252,503 A * 5/1966 Jackson ................. E05F 15/73
160/193
5,208,586 A 5/1993 Friberg
5,402,105 A 3/1995 Doyle et al.
(Continued)

FOREIGN PATENT DOCUMENTS

CA 2398665 A1 * 7/2014
JP 2014069647 4/2014
(Continued)

OTHER PUBLICATIONS

KR1020130018180—Machine Translation, dated Aug. 10, 2012, 7 pgs.
English Translation of Abstract JP201406964, dated Apr. 21, 2014, 1 page.

*Primary Examiner* — Nader Bolourchi
(74) *Attorney, Agent, or Firm* — Trenner Law Firm, LLC; Mark D. Trenner

(57) ABSTRACT

A laser guided parking assistance device and methods of operation are disclosed. An example laser guided parking assistance device includes a tilt switch to detect a vertical orientation of a horizontal orientation. The laser guided parking assistance device also includes a laser to emit a laser light beam in response to the tilt switch detecting the horizontal orientation. In an example, a laser guided parking assistance device is configured as a circuit including a battery power source, a laser diode connected in series with the battery power source, and a first tilt switch connected between the battery power source and the laser diode. The tilt switch opens in a vertical position to cut electrical power from the battery power source to the laser diode. The first tilt switch closes in a horizontal position to connect electrical power from the battery power source to the laser diode.

12 Claims, 6 Drawing Sheets

(56) References Cited

U.S. PATENT DOCUMENTS

| | | | |
|---|---|---|---|
| 5,689,236 A | 11/1997 | Kister | |
| 5,882,106 A * | 3/1999 | Galli | G02B 27/20 362/109 |
| 6,002,346 A | 12/1999 | Bowden et al. | |
| 6,154,150 A | 11/2000 | Laubach | |
| 6,184,800 B1 | 2/2001 | Lewis | |
| 6,191,706 B1 | 2/2001 | Kositkun | |
| 6,597,291 B2 | 7/2003 | Tsui | |
| 6,678,088 B1 * | 1/2004 | Stummer | H04B 10/296 359/341.41 |
| 6,853,313 B2 | 2/2005 | Newcomer | |
| 6,946,973 B1 | 9/2005 | Yanda | |
| 7,049,978 B2 | 5/2006 | Li | |
| 7,161,498 B1 * | 1/2007 | Fan | E04H 6/426 340/686.1 |
| 7,468,676 B2 | 12/2008 | Styers et al. | |
| 7,573,402 B2 * | 8/2009 | Herbert | G01S 7/497 340/556 |
| 7,869,582 B2 | 1/2011 | Styers et al. | |
| 8,373,555 B1 | 2/2013 | Redden et al. | |
| 9,171,469 B2 * | 10/2015 | Gupta | G08G 1/146 |
| 2002/0011938 A1 * | 1/2002 | Krieger | B60Q 9/004 340/932.2 |
| 2003/0160705 A1 | 8/2003 | Guetz | |
| 2006/0220834 A1 | 10/2006 | Maeng | |
| 2009/0201175 A1 * | 8/2009 | Pankowski | E04H 6/426 340/932.2 |
| 2012/0133527 A1 | 5/2012 | Lin | |
| 2013/0037339 A1 * | 2/2013 | Hickox | B60L 11/182 180/167 |
| 2016/0216067 A1 * | 7/2016 | Jackson | F41G 1/35 |

FOREIGN PATENT DOCUMENTS

| | | |
|---|---|---|
| KR | 1020130018180 | 2/2013 |
| WO | 02/50795 | 6/2002 |

* cited by examiner

LASER GUIDED PARKING ASSISTANCE DEVICE

CROSS REFERENCE TO RELATED APPLICATIONS

This application claims the priority benefit of U.S. Provisional Patent Application No. 62/196,965 filed Jul. 25, 2015 for "Laser Guided Parking Assistance Device," of Jiang Lu and Fangqin Liu, hereby incorporated by reference in its entirety as though fully set forth herein.

BACKGROUND

In most residential garages, the parking area is tight. Vehicles have to be parked at the correct position inside of the garage to leave enough area in front and back of the vehicle to enable the driver and/or passengers to enter and exit the vehicle. Various parking guides are commercially available for assisting a driver to park a vehicle inside a garage at the desired position.

An example is a laser mounted to the ceiling of the garage which casts a laser light dot onto the dashboard of a vehicle as a position reference for assisting the driver to park the vehicle at a desired position. Typically, a motion detector (e.g., detecting motion of the vehicle, or the garage door) is used to trigger operation of the laser. Alternately, the operation of the laser may be triggered by operation of the garage door opener.

Installation and maintenance of these laser guides onto the ceiling of the garage can be difficult. In addition, the sensing mechanism which actuates the laser must operate continuously (e.g., 24 hours per day, 7 days per week), even though the laser guiding function may only be used a couple of times a day for a few minutes each time. Therefore, these laser guides typically require access to the household electric (e.g., installation near an existing outlet or installation of additional electrical wiring).

The sensing mechanism can be affected by various environmental and external interferences. For example, infrared (IR) motion detection can be affected by environmental conditions (e.g., dust, spider webs, temperature), and even the height of the garage ceiling. Sensing mechanisms that trigger based on light being emitted from the light bulb of the garage door opener (e.g., to indicate operation of the garage door opener) depend on the light bulb performing properly.

Furthermore, the laser may be actuated unintentionally and may cause harm For example, pets or children may pass thru the area and actuate the laser. The laser beam may be attractive to pets or children, who may look into the laser and result in short term or even long term pain or even eye damage.

DETAILED DESCRIPTION

Figure 1:
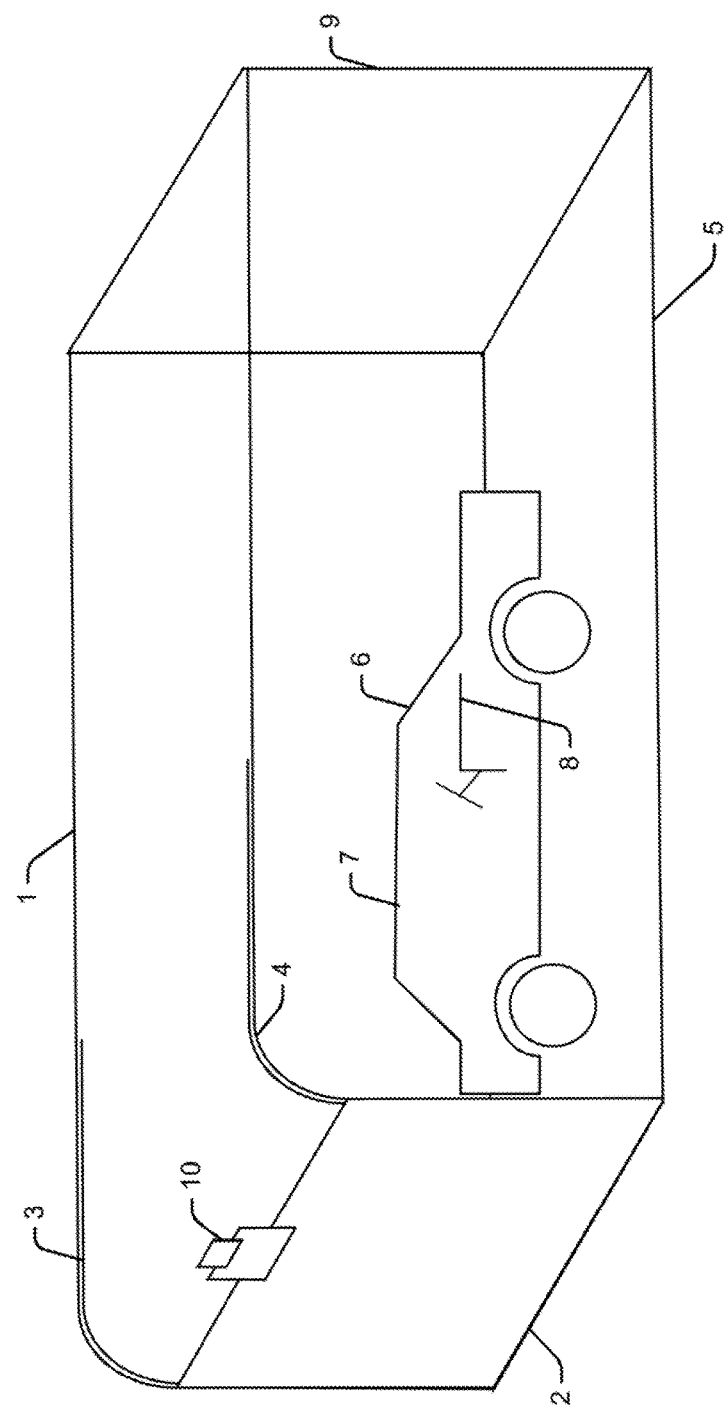
FIG. 1 illustrates a garage with a closed garage door (in a vertical position) with an example laser guided parking assistance device mounted at the top of the garage door.

A laser guided parking assistance device and method of operation is disclosed. An example laser guided parking assistance device deploys an eye safe laser for assisting vehicle operators to park a vehicle at the desired position.

In art example, the laser guided parking assistance device can be installed at a more accessible place than a ceiling of the garage (e.g., on the garage door itself), making installation and maintenance or removal easy and convenient. For example, the laser guided parking assistance device can be mounted by an attachment (e.g., screws) to attach the laser guided parking assistance device to a strut on a top panel of the garage door. In an example, the attachment can be implemented without needing tools (e.g., as a clamp or double-sided tape).

An example laser guided parking assistance device reduces electrical power consumption when the device is not in use, even down to zero power consumption. The lower power consumption also enables operation by battery power.

In an example, the laser guided parking assistance device includes a tilt switch, a battery, and an electronic circuit. When the garage door is closed, the laser guided parking assistance device is in a vertical position. When the garage door is open, the laser guided parking assistance device is in a horizontal position near the garage ceiling. The tilt switch inside the device is arranged in the way that when the garage door is in the vertical position the tilt switch is opened and when the garage door is in the horizontal position the tilt switch is closed. When the tilt switch is open, the switch cuts off battery power to all of the electronics of the laser guided parking assistance device so that the device does not consumes electrical power. When the tilt switch is closed, the switch connects electrical power to the electronics of the device which turns on the laser for guiding vehicle parking.

The tilt switch also enables a sensing function that is free of environmental and external interference, thereby increasing reliability of the laser guided parking assistance device. In addition, the laser is not activated by movement of pets or people, improving safety.

When the laser is tuned on by the garage door having reached the horizontal position near the garage ceiling, the laser shines a light beam down to the garage floor. As a vehicle moves into the garage, the laser beam shines onto the hood of the vehicle and casts a laser light dot onto the hood. As the vehicle continues to travel into the garage, the laser beam shines onto the windshield of the vehicle.

In an example, the laser guided parking assistance device is mounted at a position on the garage door such that the laser beam is shining onto the windshield slightly at an angle behind the windshield when the vehicle is reaching the desired position. This configuration causes the laser beam to be split into two laser beams by the glass of the windshield. One laser beam shines through the windshield and casts a laser light dot onto the dashboard of the vehicle. The other laser beam is deflected off of the windshield glass and casts a laser light dot onto a wall in front of the vehicle. When the vehicle is traveling to different positions, both laser light dots move to different locations. The driver can monitor either or both of the laser light dots as position references to park the vehicle at a desired position.

In an example, the laser can also be turned off by a time delay circuit when the garage door is kept in an open position. The quiescent electronic current in this state is the leaking current of the electronic components in the circuit, which is typically no more than a few micro amps for most commercial electronic components. Normal household batteries can hold power at this low level leaking current for years. The time delay circuit is reset when the garage door is closed.

Before continuing, it is noted that as used herein, the terms "includes" and "including" mean, but is not limited to, "includes" or "including" and "includes at least" or "including at least." The term "based on" means "based on" and "based at least in part on."

FIG. 1 illustrates a garage 1 with a closed garage door 2 (in a vertical position) with an example laser guided parking assistance device 10 mounted at the top of the garage door 2. The garage door 2 can move along the tracks 3 and 4.

In an example, the laser guided parking assistance device 10 includes an orientation switch, such as a tilt switch. The tilt switch may be gravity actuated. That is, the tilt switch operates based on its orientation as determined by gravitational pull. The tilt switch may be arranged such that it is open (no electrical current flow) when the garage door 2 is in a vertical position, and the tilt switch is closed (electrical current flow) when the garage door 2 is in a horizontal position. In FIG. 1, the garage door 2 is shown closed and as such the tilt switch is in the vertical position and the tilt switch is open. Power is turned off, and as such the laser is turned off.

Figure 2:
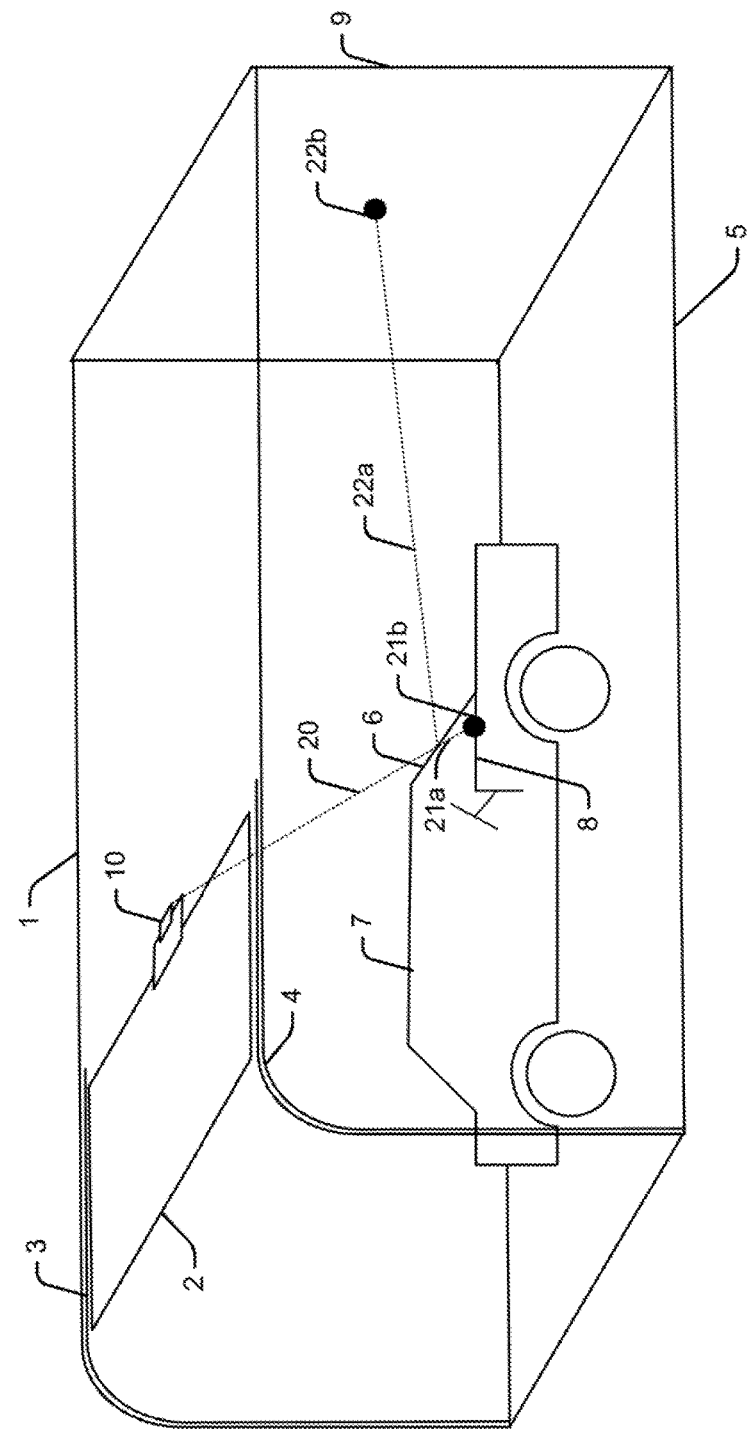
FIG. 2 illustrates a garage with an open garage door (in a horizontal position near the garage ceiling) with the example laser guided parking assistance device mounted on the top of the garage door shining a laser light beam onto the windshield of a vehicle.

FIG. 2 illustrates the garage 1 with an open garage door 2 (in a horizontal position near the garage ceiling) with the example laser guided parking assistance device 10 mounted on or near the top of the garage door. With the garage door 2 in the horizontal position, the tilt switch is closed and the electronic circuit of the laser guided parking assistance device 10 is powered on.

In an example, the laser guided parking assistance device 10 is powered by a battery. The battery is sized sufficient to actuate a laser diode which generates a laser beam 20. The laser beam 20 emits downward in the direction of the garage floor 5.

In an example, the laser guided parking assistance device 10 is mounted in a position on the garage door 2 such that the laser beam 20 is emitted at an angle selected to be a behind the windshield 6 of the vehicle 7 when the vehicle 7 is moving close to the desired parking position, it is understood that this angle can be adjusted for a generic vehicle and/or determined based on the specific configuration of the vehicle being operated (e.g., including vehicle height and angle of the windshield).

When the laser beam 20 hits the windshield 6 of the vehicle 7, the laser beam 20 is split by the glass of the windshield 6, and forms two beams 21a and 22a. Light beam 21a transmits through the windshield 6 and casts a laser light dot 21b onto the dashboard 8 of the vehicle 7. The laser beam 22a is deflected off of the windshield 6 and casts a laser light dot 22b onto the wall 9 in front of the vehicle 7. Accordingly, the driver (or passenger) can visually observe the position of the vehicle 7 relative to a desired parking area within the garage 1.

Figure 3:
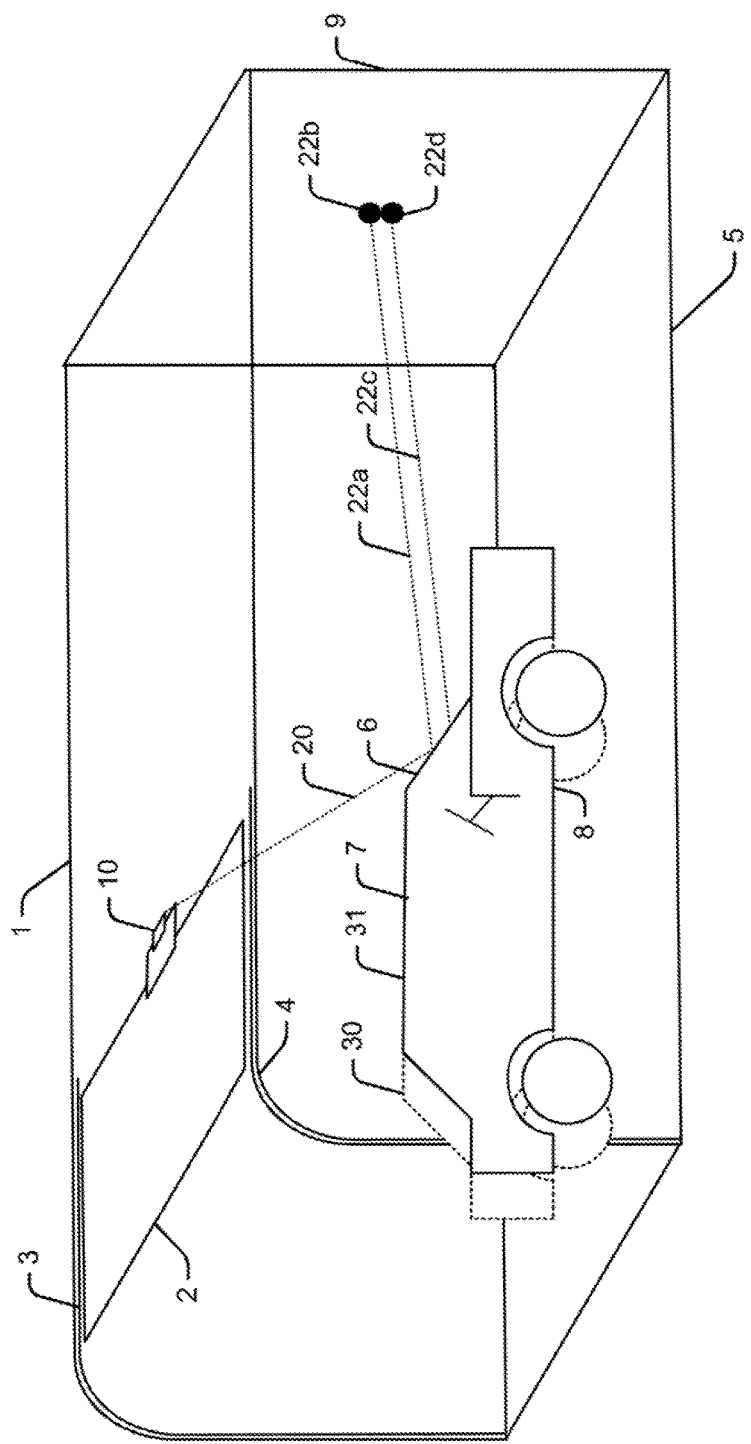
FIG. 3 illustrates the vehicle moving through different positions in the garage, and reflecting a laser light dot from the example laser guided parking assistance device onto the wall in front of the vehicle.

FIG. 3 illustrates the vehicle 7 moving through different positions in the garage 1 and reflecting a laser light dot from the example laser guided parking assistance device 10 onto the all 9 in front of the vehicle 7.

In the example shown in FIG. 3, the vehicle 7 is shown moving from a position 30 to a position 31. For the position 30 of the vehicle 7, the deflected laser beam is illustrated by line 22a and the laser light dot is shown at 22b. For the position 31 of the vehicle 7, the deflected laser beam is illustrated by line 22c and the laser light dot is shown at 22d. At the same time that the user sees dots moving on the wall from 22b to 22d, the laser light dot 21b on the dashboard 8 of the vehicle also moves (not shown) to a new position on the dashboard 8.

In an example, marking can be provided by the manufacturer of the laser guided parking assistance device 10 to affix to the wall 9 and/or the dashboard 8 of the vehicle 7. In another example, the driver may provide his or her own markings and/or simply remember the relative position of the dots with respect to the desired parking alignment.

Before continuing, it should be noted that the examples described above are provided for purposes of illustration, and are not intended to be limiting. Other devices and/or device configurations may be utilized to carry out the operations described herein.

By way of non-limiting example, the orientation of the switch may be reversed and the circuit wired accordingly. In another example, multiple lights may be provided and/or the position of the lights may vary. Likewise, the light source is not limited to a laser and can be any suitable light source (e.g., LED lighting). These and other variations will be readily understood by those having ordinary skill in the art after becoming familiar with the teachings herein.

Figure 4:
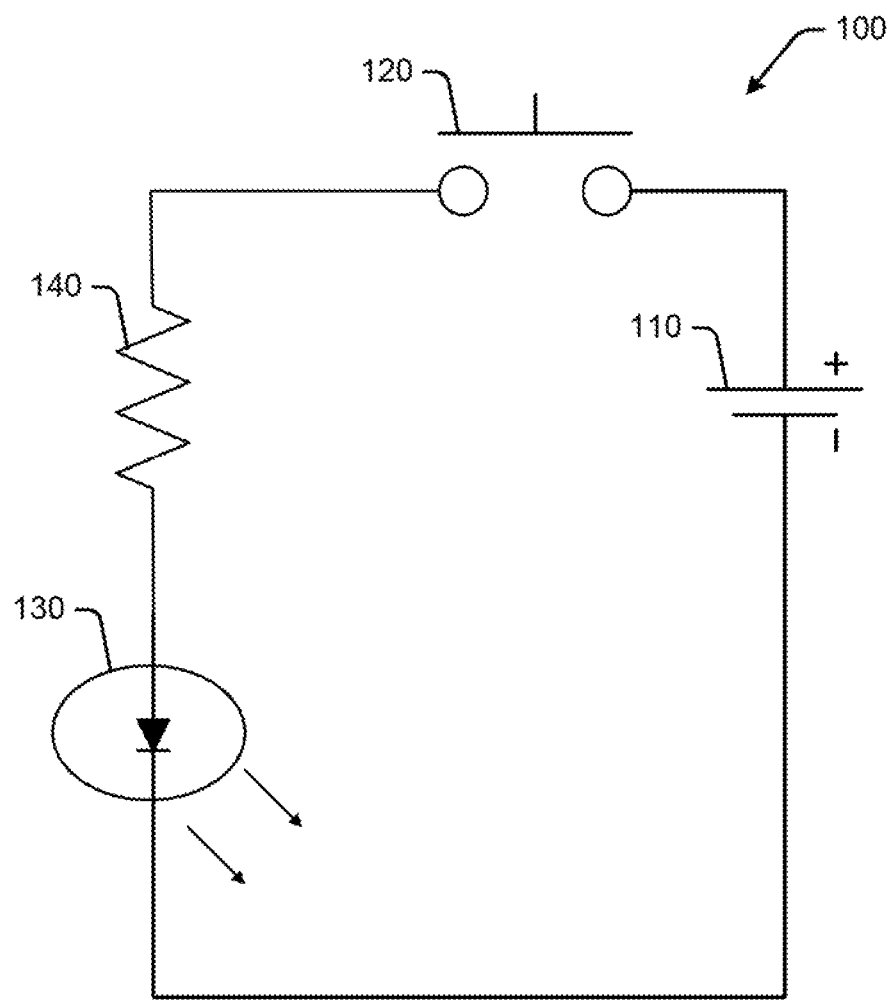
FIG. 4 is a circuit diagram of an example laser guided parking assistance device.

FIG. 4 is a diagram of an example circuit 100 to implement the laser guided parking assistance device. In an example, the circuit has only four components, simplifying the circuit, minimizing cost, and improving reliability. However, the circuit is not limited to any particular number of components.

In an example, the circuit 100 includes a battery 110 to provide electrical power. The circuit 100 also includes a tilt switch 120 to turn power on and off in the circuit The tilt switch 110 may be opened or closed based on orientation of the switch. The circuit 100 also includes a laser diode 130 to generate and emit a laser beam. The circuit may also include a resistor 140 to set the electrical current flowing through the laser diode 130 and determines the output or brightness of the laser beam.

Figure 6:
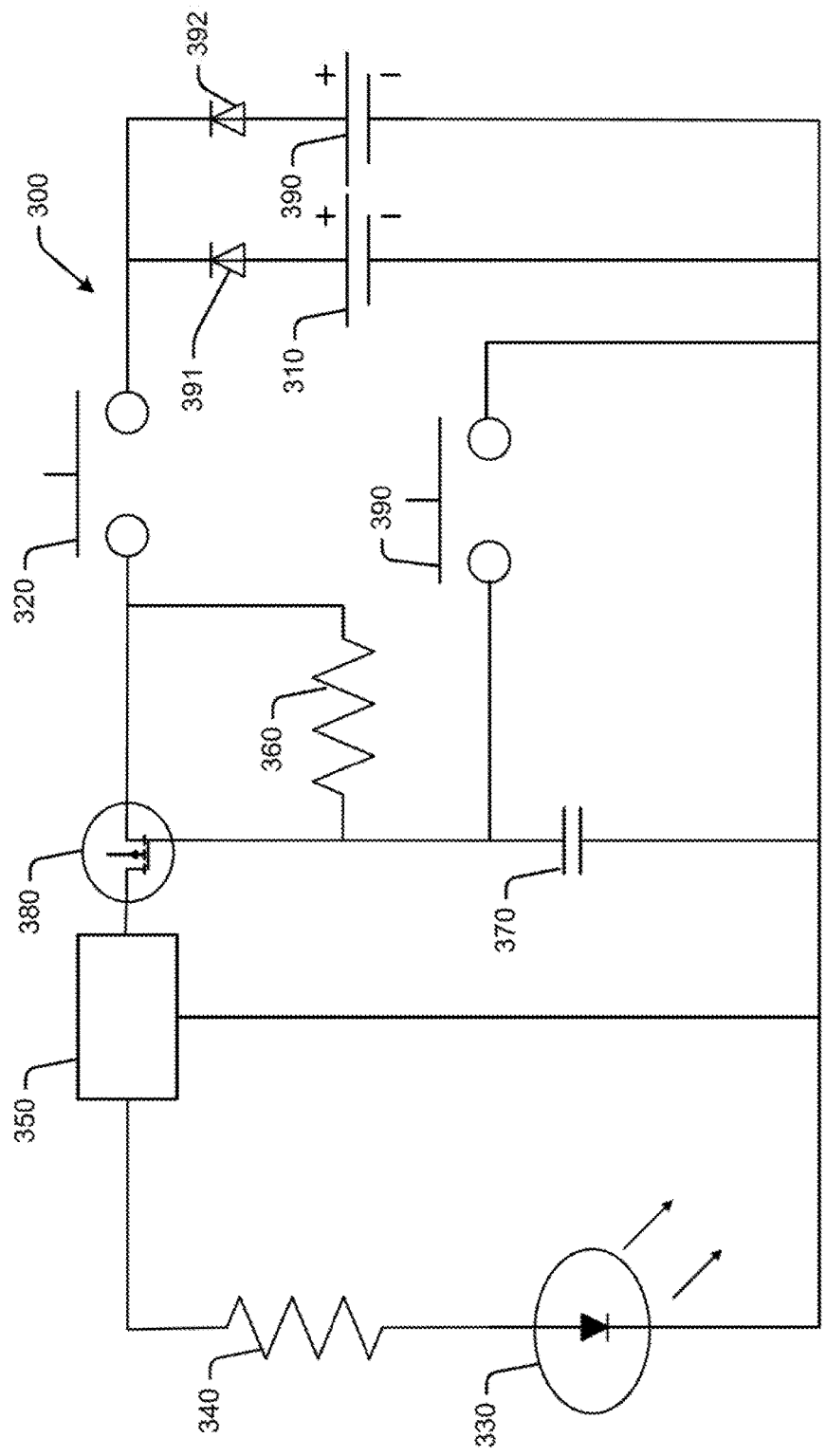
FIG. 6 is a circuit diagram of another example laser guided parking assistance device with a solar battery to provide electrical power.

FIG. 6 is a diagram of another example circuit 200 to implement the laser guided parking assistance device, in an example, the circuit 200 includes a battery 210 to provide electrical power. The circuit 200 also includes a tilt switch 220 to turn power on and off in the circuit. The tilt switch 220 may be opened or closed based on orientation of the switch. The circuit 200 also includes a laser diode 230 to generate and emit a laser beam. The circuit may also include a resistor 240 to set the electrical current flowing through the laser diode 230 and determines the output or brightness of the laser beam.

Figure 5:
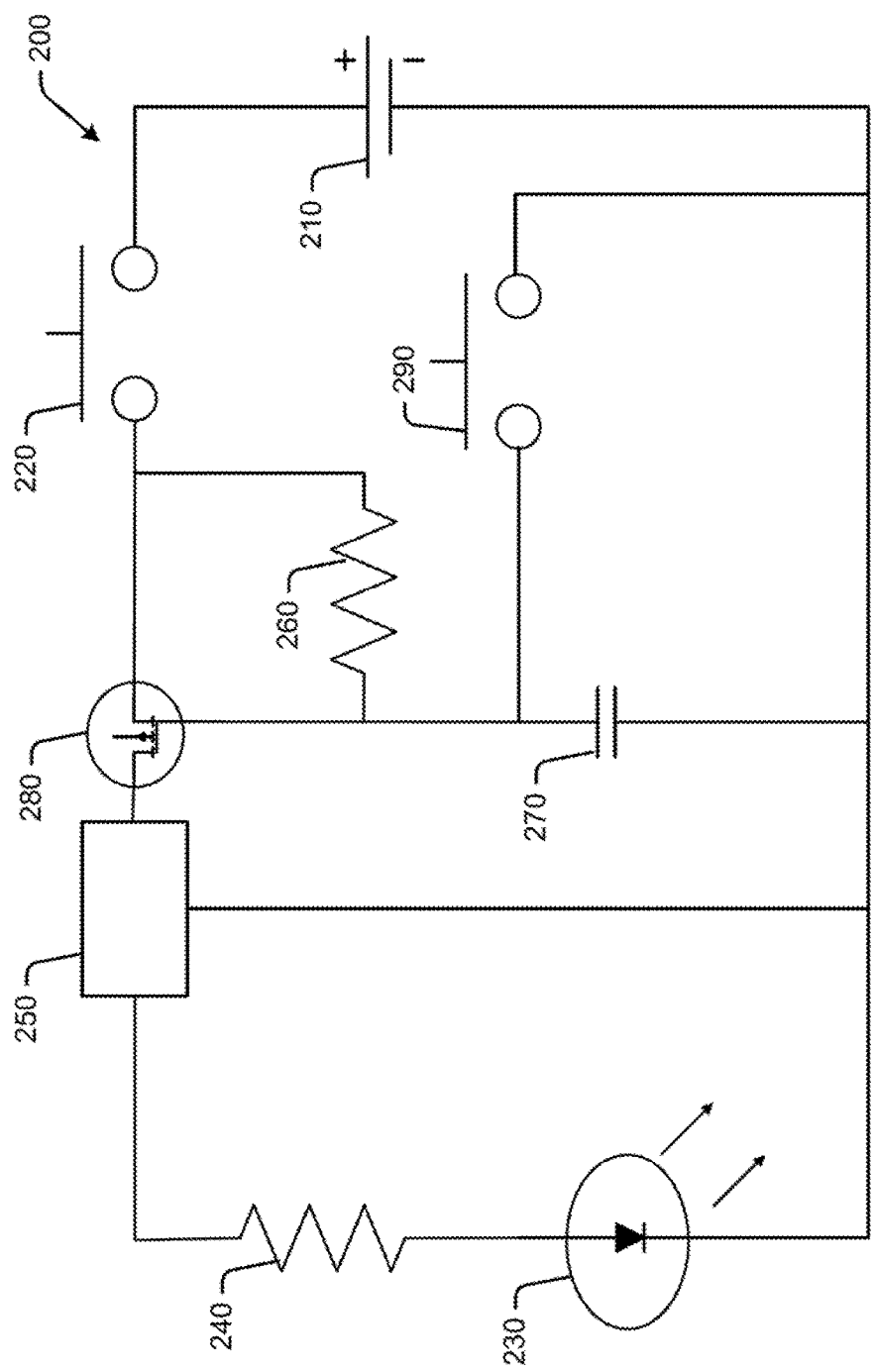
FIG. 5 is a circuit diagram of another example laser guided parking assistance device with a time delay circuit to turn off the laser if the garage door is left in an open position.

In addition, the example circuit 200 shown in FIG. 5 includes a time delay circuit to turn off the laser if the garage door is left in an open position. The time delay circuit may be implemented as an R-C time delay circuit including resistor 260 and capacitor 270. If the garage door is left open, the capacitor 270 is charged through resistor 260. When the voltage on capacitor 270 reaches a predetermined level, it turns off the metal oxide semiconductor field effect transistor (MOSFET) switch 280 and therefore turns off the laser diode 230. When the MOSFET switch 280 is turned off, the quiescent current of the circuit is the leaking currents of the MOSFET switch 280 and the capacitor 270. These are typically only a few micro amps for most available commercial products. Discharging at this rate, a standard AA battery can last for years.

In addition, the example circuit 200 shown in FIG. 5 may include a second tilt switch 290. Tilt switch 290 provides a quick discharge path for capacitor 270 when the garage door is closed. As such, the circuit 200 is ready to turn on the laser diode 230 again without delay after the garage door has been closed. In an example, the second tilt switch 290 is physically arranged in a perpendicular orientation relative to the tilt switch 220. As such, the tilt switch 220 is closed when the garage door is closed, and the tilt switch 220 is open when the garage door is open. It is noted that the physical orientation of the switches 220 and 290 is not illustrated by the circuit diagram.

FIG. 6 is a diagram of another example circuit 300 to implement the laser guided parking assistance device. In an example, the circuit 300 includes a battery 310 to provide electrical power. The circuit 300 also includes a tilt switch 320 to turn power on and off in the circuit. The tilt switch 310 may be opened or closed based on orientation of the switch. The circuit 300 also includes a laser diode 330 to generate and emit a laser beam. The circuit may also include a resistor 340 to set the electrical current flowing through the laser diode 330 and determines the output or brightness of the laser beam.

In addition, the example circuit 300 shown in FIG. 6 implements a voltage regulator 350 to provide a regulated voltage to drive the laser diode 330. As such, the brightness of the laser light is not affected by the battery voltage change over the time due to discharge, as long as the battery is still capable of providing an operating power for the laser diode 330.

In addition, the example circuit 300 shown in FIG. 6 includes a time delay circuit to turn off the laser if the garage door is left in an open position. The time delay circuit may be implemented as an R-C time delay circuit including resistor 360 and capacitor 370. If the garage door is left open, the capacitor 370 is charged through resistor 360. When the voltage on capacitor 370 reaches a predetermined level, it turns off the MOSFET switch 380 and therefore turns off the laser diode 330. When the MOSFET switch 380 is turned off, the quiescent current of the circuit is the leaking currents of the MOSFET switch 380 and the capacitor 370. These are typically only a few micro amps for most available commercial products. Discharging at this rate, a standard AA battery can last for years.

In addition, the example circuit 300 shown in FIG. 6 may include a second tilt switch 390. Tilt switch 390 provides a quick discharge path for capacitor 370 when the garage door is closed As such, the circuit 300 is ready to turn on the laser diode 330 again without delay after the garage door has been closed. In an example, the second tilt switch 390 is physically arranged in a perpendicular orientation relative to the tilt switch 320. As such, the tilt switch 390 is dosed when the garage door is dosed, and the tilt switch 390 is open when the garage door is open. It is noted that the physical orientation of the switches 320 and 390 is not illustrated by the circuit diagram.

In FIG. 6, the circuit 300 is also shown including a solar battery 390 to provide electrical power. In an example, the solar battery 390 can be mounted on the window of the garage door, or the solar battery can be mounted on the outer side of the garage door. For example, if the garage door does not have glass windows, the solar battery can be installed on the outer side of the garage door. The solar battery 390 can be implemented in parallel with a standard battery 310, or by itself. When implemented as shown in the circuit diagram of FIG. 6, diodes 391 and 392 may also be provided.

The example circuits 100, 200, and 300 shown and described herein are provided only for purposes of illustration and are not intended to be limiting. Other circuits (simple or more sophisticated) may be implemented, as will be readily understood by those having ordinary skill in the art after becoming familiar with the teaching herein.

It is noted that the examples shown and described are provided for purposes of illustration and are not intended to be limiting. Still other examples are also contemplated.

The invention claimed is:

1. A laser guided parking assistance device for parking a vehicle in a parking structure, comprising:
   a tilt switch for mounting on an overhead door of the parking structure, the tilt switch open when the overhead door is closed and the tilt switch closed when the overhead door reaches a horizontal position near a ceiling of the parking structure; and
   a laser for mounting on the overhead door, the laser turned off by the tilt switch when the overhead door is closed, the laser turned on by the tilt switch when the overhead door reaches the horizontal position near the ceiling of the parking structure to emit a laser light beam onto a floor of the parking structure, the laser positioned at an angle to emit the laser light beam on the floor of the parking structure and as a vehicle moves into the parking structure the laser light beam appearing on a hood of the vehicle and then onto a windshield of the vehicle so that the laser light beam is shining at an angle behind the windshield as the vehicle approaches a desired parking position in the parking structure, the laser light beam split by glass of the windshield of the vehicle into two laser beams, such that one of the two laser beams shines through the windshield of the vehicle and casts a laser light dot onto a dashboard of the vehicle, and another one of the two laser beams is deflected off of the windshield of the vehicle and casts a laser light dot onto a wall of the parking structure in front of the vehicle;
   wherein movement of the vehicle toward the wall of the parking causes the laser light dot on the dashboard of the vehicle to move to a different location on the dashboard of the vehicle, and the laser light dot on the wall of the parking structure to move to a different location on the wall of the parking structure as the vehicle travels to different positions in the parking structure so that a driver of the vehicle can monitor locations of both the laser light dot on the dashboard of the vehicle and the laser light dot on the wall of the parking structure as visual position references relative to known positions indicating the desired position of the vehicle in the parking structure to park the vehicle at the desired position in the parking structure.

2. The laser guided parking assistance device of claim 1, wherein the tilt switch is gravity sensing.

3. The laser guided parking assistance device of claim 1, further comprising a body housing the tilt switch and the laser.

4. The laser guided parking assistance device of claim 3, further comprising an attachment to attach the body to a garage door.

5. The laser guided parking assistance device of claim 1, further comprising a time delay circuit to turn off the laser when a garage door is kept in an open position.

6. The laser guided parking assistance device of claim 1, further comprising a battery providing power to the laser without need for a household electric source.

7. A laser guided parking assistance device for parking a vehicle in a garage, comprising:
   a battery power source;
   a laser diode for mounting on the garage door of the garage, the laser diode electrically connected in series with the battery power source; and
   a first tilt switch for mounting on the garage door of the garage, the first tilt switch electrically connected between the battery power source and the laser diode, the tilt switch opening when the garage door is in a vertical position to cut electrical power from the battery power source to the laser diode, the first tilt switch closing when the garage door is in a horizontal position to connect electrical power from the battery power source to the laser diode to emit a laser light onto a windshield of a vehicle as the vehicle is reaching a desired parking position in the garage so that the laser light beam is split by glass of the windshield of the vehicle into two laser beams, such that one of the two laser beams shines through the windshield of the vehicle and casts a laser light dot onto a dashboard of the vehicle, and another one of the two laser beams is deflected off of the windshield of the vehicle and casts a laser light dot onto a wall of the garage in front of the vehicle;
   wherein movement of the vehicle toward the wall of the garage causes the laser light dot on the dashboard of the vehicle to move to a different location on the dashboard of the vehicle, and the laser light dot on the wall of the garage to move to a different location on the wall of the garage as the vehicle travels to different positions in the parking structure so that a driver of the vehicle can monitor locations of both of the laser light dots on the dashboard and on the wall as visual position references relative to known positions indicating the desired position of the vehicle in the garage;
   a resistor-capacitor time delay circuit, wherein a capacitor charges through a resistor when the garage door is left open, and when a voltage on the capacitor reaches a predetermined level, a MOSFET switches to turn off the laser diode; and
   a second tilt switch providing a quick discharge path for the capacitor when the garage door is closed, the second tilt switch perpendicular to the first tilt switch so that the second tilt switch is closed when the garage door is closed, and the second tilt switch is open when the garage door is open.

8. The laser guided parking assistance device of claim 7, further comprising a resistor in series with the laser diode, the resistor setting electrical current to the laser diode to determine brightness of a laser beam generated by the laser diode.

9. The laser guided parking assistance device of claim 7, further comprising a voltage regular to provide a regulated voltage to drive the laser diode, to maintain a substantially constant light output even as the battery power source declines in power output.

10. The laser guided parking assistance device of claim 7, wherein the battery power source is a solar battery.

11. A method of operating laser guided parking assistance device for parking in a garage, comprising:
   detecting by a tilt switch mounted on a garage door, an orientation of the garage door; and
   emitting a laser light beam in response to the tilt switch detecting the horizontal orientation indicating an open garage door, the laser beam shining onto a windshield of a vehicle as the vehicle is reaching a desired parking position in the garage, the laser light beam shining at an angle selected based on a specific vehicle configuration to be behind the windshield of the vehicle when the vehicle approaches a desired parking position in the garage, the laser light beam split by glass of the winds yield of the vehicle into two laser light beams, such that one of the two laser light beams shines through the windshield of the vehicle and casts a laser light dot onto a dashboard of the vehicle, and another one of the two laser light beams is deflected off of the windshield of the vehicle and casts a laser light dot onto a wail of the garage in front of the vehicle;
   wherein the vehicle moving toward the wall of the parking causes the two laser light dots to be visible at different locations on the dashboard of the vehicle and the wall of the garage as the vehicle travels to different positions in the garage so that a driver of the vehicle can monitor both the laser light dots as visual position references relative to known positions on the dashboard and the wall of the garage indicating the desired position of the vehicle in the garage so that the user can to park the vehicle at a desired position in the garage.

12. The method of claim 11, further comprising the tilt switch opening in a vertical position to cut electrical power to a laser diode emitting the laser light beam, and the tilt switch closing in a horizontal position to power the laser diode.

* * * * *